United States Patent [19]
Hansen et al.

[11] Patent Number: 6,026,646
[45] Date of Patent: Feb. 22, 2000

[54] THERMAL STORAGE SYSTEM FOR A VEHICLE

[75] Inventors: Scott Allen Hansen; Nels R. Smith, both of Holland, Mich.

[73] Assignee: Prince Corporation, Holland, Mich.

[21] Appl. No.: 09/138,755

[22] Filed: Aug. 24, 1998

[51] Int. Cl.[7] .................................................. F25B 21/02
[52] U.S. Cl. .................................. 62/3.6; 62/239; 220/6; 224/483; 224/275; 224/929; 224/543
[58] Field of Search ............................... 62/3.2, 239, 3.6; 220/6; 224/275, 483, 929, 543

[56] References Cited

U.S. PATENT DOCUMENTS

| | | | |
|---|---|---|---|
| 2,577,263 | 12/1951 | Myers | 224/543 |
| 5,067,652 | 11/1991 | Enander | 237/81 |
| 5,181,555 | 1/1993 | Chruniak | 165/41 |
| 5,365,739 | 11/1994 | Fetterly | 62/3.62 |
| 5,490,396 | 2/1996 | Morris | 62/457.2 |
| 5,495,971 | 3/1996 | Holliday | 224/483 |
| 5,551,755 | 9/1996 | Lindberg | 297/411.46 |
| 5,582,028 | 12/1996 | Rilling et al. | 62/530 |
| 5,743,585 | 4/1998 | Pranger et al. | 296/37.12 |
| 5,836,496 | 11/1998 | Levin et al. | 224/553 |

*Primary Examiner*—Henry Bennett
*Assistant Examiner*—Mark Shulman
*Attorney, Agent, or Firm*—Harness, Dickey & Pierce, P.L.C.

[57] ABSTRACT

A thermal storage system providing a receptacle in a motor vehicle which can be used to keep refrigerated items cool or heated items hot during transportation of those items. The receptacle is removably mounted from the vehicle to facilitate carrying of the items to and from the vehicle. Additionally, the receptacle can be folded to reduce its size for storage within a cavity in the motor vehicle after passing the receptacle through an opening in a vehicle interior component. The receptacle has insulated walls which operate to keep the stored items either heated or cooled in passive operation. Active heating or cooling can be provided with a thermoelectric element.

27 Claims, 6 Drawing Sheets

THERMAL STORAGE SYSTEM FOR A VEHICLE

BACKGROUND OF THE INVENTION

The present invention relates to a thermal storage system for a vehicle and in particular to an insulated receptacle for a vehicle which is stored within a cavity in the vehicle and is removable from the cavity while remaining attached to the vehicle. The receptacle is also removable from the vehicle.

When travelling home from a grocery store, it is not uncommon to have items such as milk, other dairy products and meat, which must be maintained at a cool temperature. If the grocery store is some distance from home, these items can reach unsafe temperatures. The problem of maintaining a proper temperature is worsened if it is necessary to make one or more stops between the grocery store and home. On a warm day, the interior temperature of a motor vehicle can quickly exceed 120° Fahrenheit. It is also difficult to maintain heated or prepared foods at an elevated temperature during transport.

One method of maintaining articles at a proper temperature is to carry an ice chest in a vehicle in which refrigerated items can be stored during the trip home. However, if a trip to the grocery store is not planned in advance, the ice chest may not be in the vehicle when needed. If an ice chest is always kept in the vehicle, the cargo carrying capacity of the vehicle is reduced.

Accordingly, it is an object of the present invention to overcome the above disadvantages and difficulties in safely transporting refrigerated or heated food items.

SUMMARY OF THE PRESENT INVENTION

The present invention is a thermal storage system for a motor vehicle. A receptacle having insulated walls is provided for keeping items either cold or hot during transport. The receptacle is stored within a cavity in the vehicle. Access to the cavity is gained through an opening in a vehicle interior component. A releasable attachment device is provided to retain the receptacle in place in the vehicle when it is removed from the storage cavity. The attachment device is releasable so that the receptacle can be used to carry items away from the vehicle.

In one embodiment of the invention, the walls of the receptacle are made of a flexible material enabling the receptacle to be folded by flexing the walls. This reduces the size of the receptacle for storage within the cavity. In another embodiment, the walls of the receptacle are made of rigid wall panels which are hinged to one another, enabling the receptacle to be folded flat for storage in a cavity in a trim panel.

As used herein, the interior of the vehicle is intended to mean the passenger compartment or a storage compartment, such as the trunk of a passenger car or the cargo box of a pickup truck. When used in a pickup truck cargo box, the cavity can be formed in a cargo box side wall or in a cargo box bedliner.

In one embodiment of the invention, the receptacle is a passive device in which the insulation maintains items at a temperature that is either cooler or hotter than the ambient temperature. In another embodiment of the invention, the receptacle includes a thermoelectric heating and cooling element such as a Peltier element which either cools or heats the interior of the receptacle to maintain the desired temperature.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
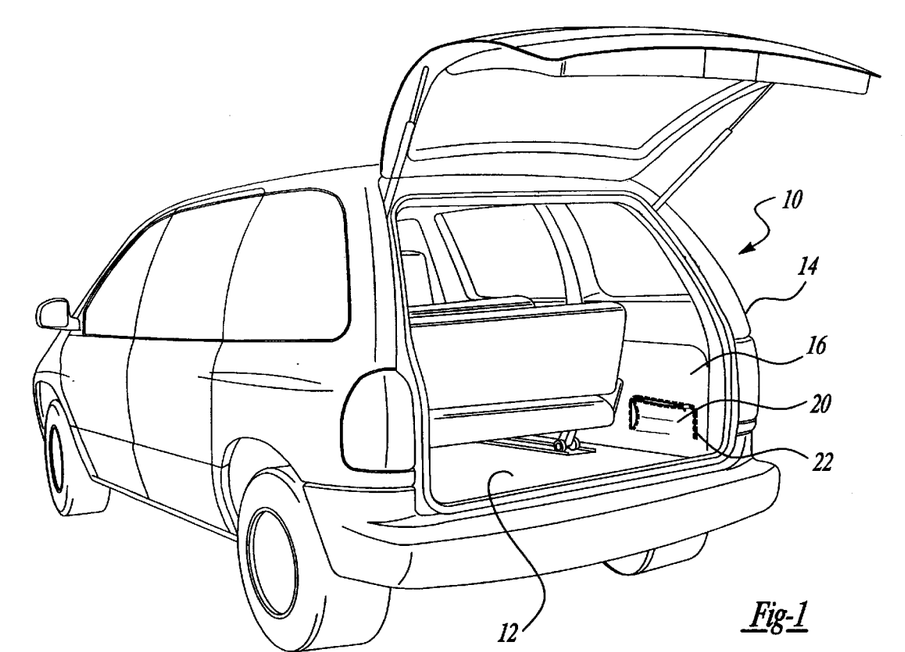
FIG. 1 is a perspective view of a rear interior portion of a motor vehicle containing the thermal storage system of the present invention with the receptacle of the storage system in a stored position.

With reference to FIG. 1, the thermal storage system of the present invention is shown within a motor vehicle 10. The vehicle 10 is a minivan having a vehicle body which includes a floor 12 and an upright body side wall 14. In the interior of the vehicle, a trim panel 16 is attached to the body side wall 14 and forms an interior surface in the passenger compartment of the vehicle. The trim panel 16 is formed with an opening 18 which is covered by a door 20. The door 20 is shown in FIG. 1 in a position closing the opening 18. The door 20 is held in a closed position by a zipper 22 which extends across the top and the two vertical sides of the door 20. The door 20 is made of fabric which forms a flexible hinge across the lower edge of the door 20 enabling the door 20 to rotate downward from the opening 18 when the zipper 22 is opened. Alternatively, a hard panel door such as the door typically used for a glove box can be used in the trim panel 16 to close the opening 18.

A cavity 24 is located behind the opening 18. The cavity 24 can be formed by a recessed area in the trim panel 16. Alternatively, the trim panel 16 may simply contain the opening 18 to gain access to a cavity 24 between the trim panel 16 and the body side wall 14.

A receptacle 26 is stored within the cavity 24. The receptacle 26 is formed of walls 28 made of a flexible, insulated material shown in greater detail in FIG. 4. The walls 28 are flexible to enable the receptacle 26 to be folded by flexing of the walls 28. This reduces the size of the receptacle 26 for storage within the cavity 24. Alternatively, if the cavity 24 is large enough, the receptacle 26 can be stored in the cavity 24 without folding of the receptacle 26.

Figures 3, 4, 5:
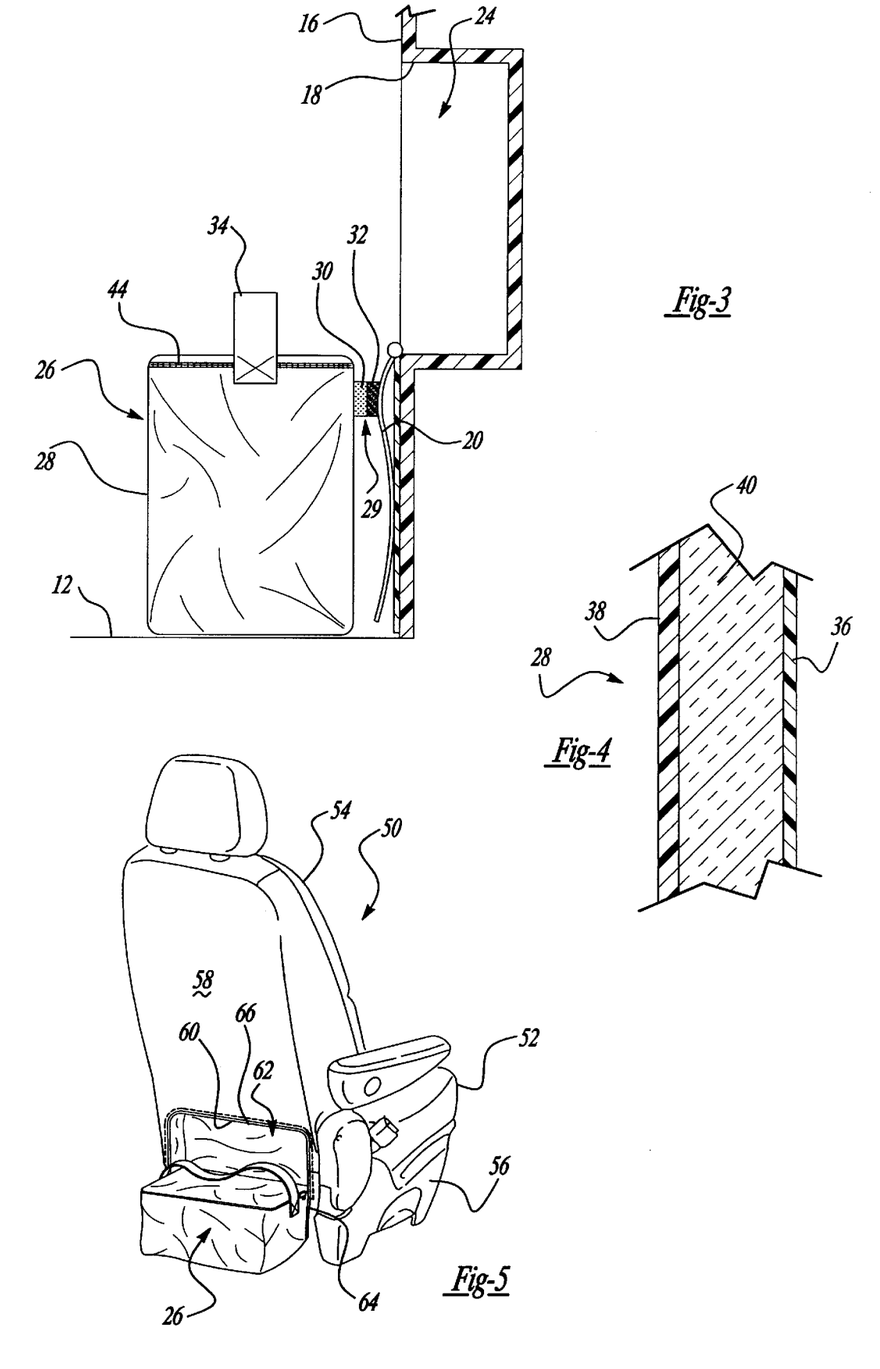
FIG. 3 is a sectional view of the receptacle and vehicle interior component as seen from substantially line 3—3 of FIG. 2.
FIG. 4 is a sectional view through a wall of the receptacle shown in FIGS. 2 and 3.
FIG. 5 is a perspective view of a vehicle seat assembly having the thermal storage system of the present invention in the seat back with the receptacle shown in an unfolded position.

The attachment device 29 for retaining the receptacle 26 in the vehicle is shown in FIG. 3. In this embodiment, the receptacle 26 is attached to the door 20 of the trim panel 16. Mating hook and loop fastener strips 30 and 32 are provided on the receptacle 26 and the door 20. The fastening strips 30 and 32 enable the receptacle 26 to be retained in place upon the floor 12 and attached to the trim panel 16. This attachment device keeps the receptacle 26 from moving about the vehicle interior during normal driving. The hook and loop fastener strips 30, 32 can be released to remove the receptacle 26 from the vehicle. The receptacle 26 can be attached to the vehicle interior compartment inside the cavity 24 or elsewhere if desired. The attachment device is not limited to the door 20. The attachment device can include mechanisms other than the hook and loop fastener strips 30, 32. Other mechanisms such as zippers, buttons, ties, snaps hooks, J-hook strips, magnet strips, mechanical latches and the like can be used.

A handle 34 is provided to facilitate carrying of the receptacle 26. The handle 34 is flexible webbing sewn to the walls 28 enabling the handle 34 to fold with the receptacle 26. The construction of the receptacle walls 28 is shown in greater detail in FIG. 4. The walls 28 include an inner layer or liner 36, an outer layer 38 and an insulating layer 40 between the inner and outer layers 36, 38. The inner layer 36 is preferably a rubberized, water-proof nylon material that is light weight. Other light weight water-proof materials can be used such as, but not limited to, Kevlar and Mylar. In addition, an aluminum foil can be placed on the surface of the inner layer 36 to reflect thermal radiation. Preferably, the inner layer 36 is light weight to minimize the thermal mass of the inner layer 36. By minimizing the thermal mass, there is less heat loss or gain to the stored items as a result of heating or cooling of the inner layer 36 by the stored article.

The outer layer 38 is made of a durable, wear resistant material such as cordura nylon. Any of a variety of materials can be used which provide durability and wear resistance to the exterior of the receptacle. Preferably, the exterior color is light to reduce the adsorption of radiant energy. Aluminum foil can also be located between the outer layer 38 and the insulating layer 40 to enhance reflection.

The insulating layer 40 can be formed by a variety of lofted, insulating materials. One suitable material is a bat of non-woven PET fibers. Other lofted fiber materials, flexible foam sheets, etc. can be used for the insulating layer 40.

Figure 2:
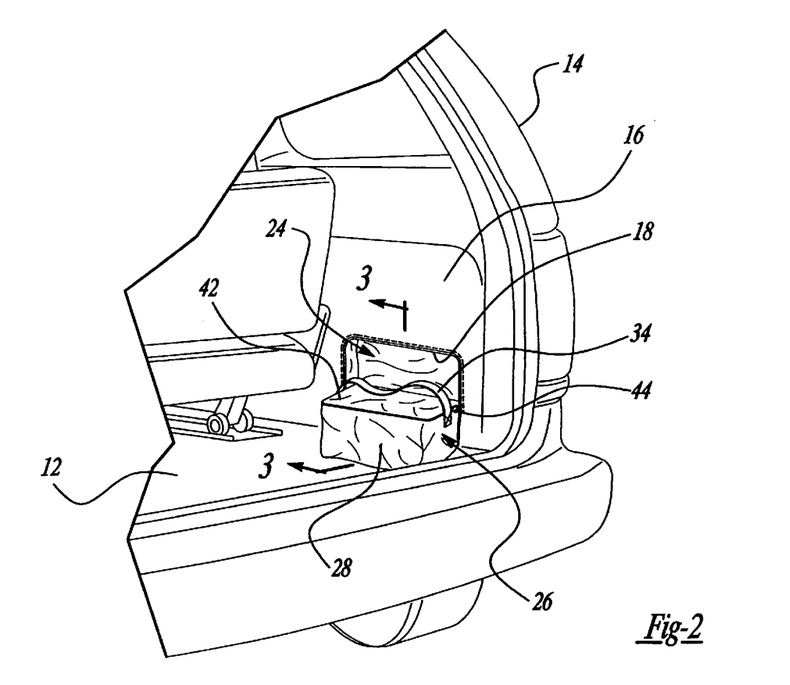
FIG. 2 is a perspective view, like FIG. 1, illustrating the receptacle of the thermal storage system in an unfolded position.

With reference again to FIG. 2, the top wall of the receptacle 26 forms a lid 42 through which access into the receptacle 26 is gained. A zipper 44 extends around the periphery of the lid 42 along three sides to secure the lid 42 to the upright sidewalls 28.

With reference to FIG. 5, an alternative embodiment of the storage system is shown in which the storage system is part of a vehicle seat assembly 50. The seat assembly 50 has a generally horizontal seat bottom 52 and a seat back 54 extending upwardly from a rear end of the seat bottom 52. The seat back 54 and the seat bottom 52 are supported on a base 56 which is adapted to be mounted to the motor vehicle floor 12. The rear surface 58 of the seat back 52 is formed with an opening 60 providing access to a cavity 62 in the seat back 52. The opening 60 is closed by a cover 64 which is shown in FIG. 5 in the open position. A zipper 66 about the periphery of the opening 60 and the cover 64 forms a fastener device to hold the cover 64 in the closed position in the opening 60. Alternative fastener devices can be used to hold the cover 64 or the cover 20 (FIG. 1) in a closed position such as hook and loop fastening strips, snaps, hooks, buttons, J-hook strip fasteners, magnet strips, string ties, latch mechanisms and the like. The receptacle 26 is attached to the cover 64 and stored in the cavity 62 in the manner described above in conjunction with FIG. 1.

Figures 6, 7, 8, 9:
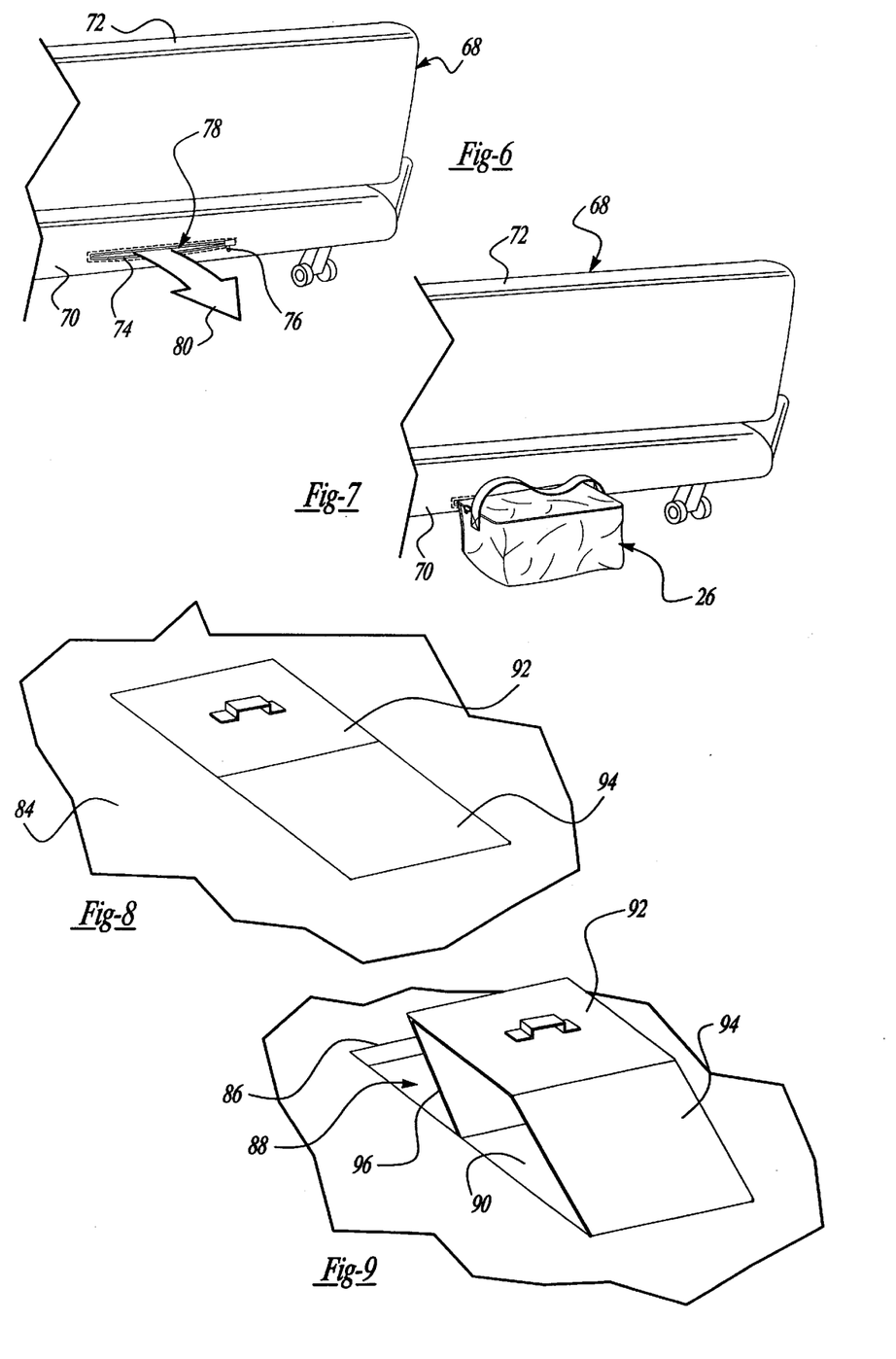
FIGS. 6 and 7 are perspective views of a vehicle seat assembly having the thermal storage system of the present invention in the seat bottom with the receptacle shown in stored and unfolded positions, respectively.
FIGS. 8, 9 and 10 are perspective views illustrating an alternative embodiment of the receptacle of the thermal storage system having hard wall panels shown in a folded position, in a partially unfolded position and in a near fully unfolded position, respectively.
Figures 10, 11:
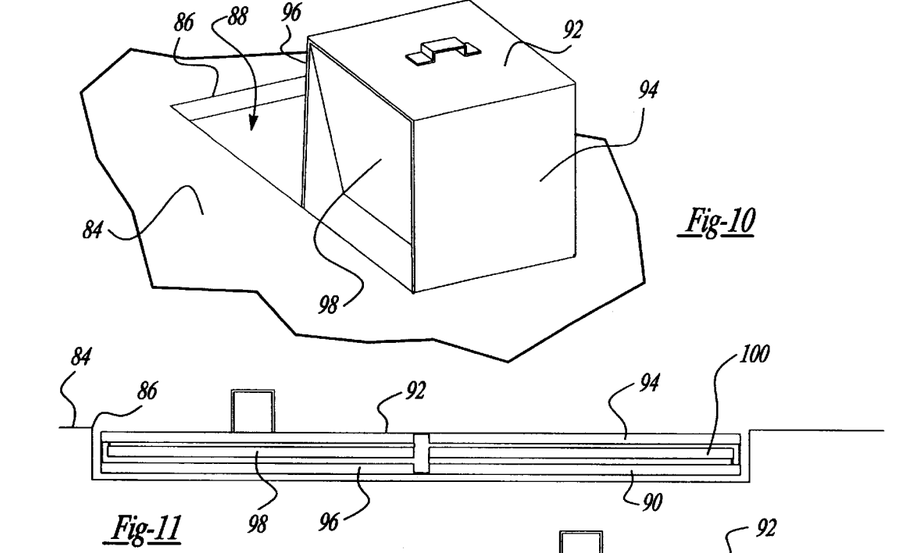
FIG. 11 is a side view of the thermal storage system shown in FIG. 8.
Figure 12:
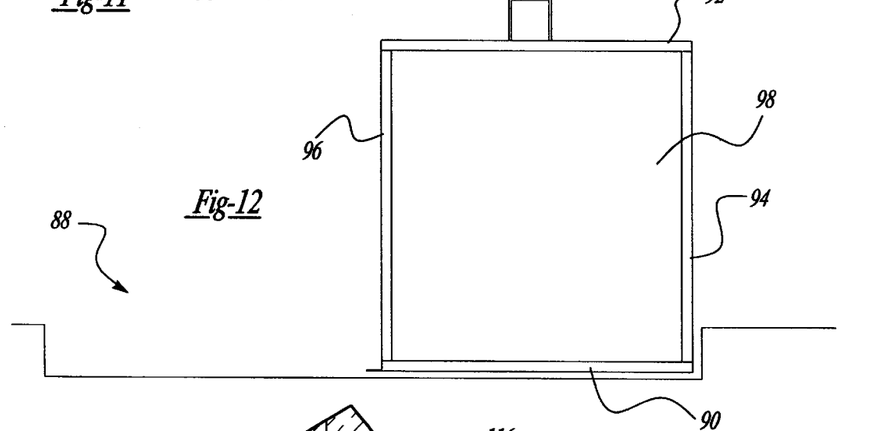
FIG. 12 is side view of the thermal storage system shown in FIG. 10, in a completely unfolded position.

Yet another embodiment of the thermal storage system is shown in conjunction with FIGS. 6 and 7. There a bench seat assembly 68 is shown having a seat bottom 70, only the rear edge of which is shown, and a seat back 72. An opening 74 is provided in the seat bottom 70 along the rear edge. The opening 74 is opened and closed by a zipper 76. The opening leads to a cavity 78 in the seat bottom. The receptacle 26 is stored in the cavity 78 and is removed as shown by the arrow 80 in FIG. 6. The receptacle 26 rests on the floor 12 when unfolded. The receptacle 26 is attached to a portion of the seat assembly 68 trim cover within the cavity 78 to retain the receptacle 26 in place in the vehicle.

An alternative embodiment of the thermal storage system is shown in connection with FIGS. 8–12. A receptacle 126 is shown constructed of a plurality of substantially rigid wall panels joined to one another by hinges. The receptacle 126 is shown in a stored position in FIGS. 8 and 11 within a vehicle floor panel 84. The floor panel 84 could be a trunk floor panel, or floor panel in the rear of the passenger compartment of a van or sport utility vehicle or in a movable trunk storage system, such as that shown in U.S. Pat. No. 5,501,384 assigned to the Prince Corporation and incorporated herein by reference.

The floor panel 84 has an opening 86 to a cavity 88 formed by a recess in the floor panel 84. The cavity 88 enables the receptacle 126 to be stored in the floor panel 84 without projecting upward above the vehicle floor 12. The receptacle 126 has a bottom wall 90, a top wall 92, side walls 94 and 96 and end walls 98 and 100. The bottom wall 90 and side wall 94 are coupled together with a flexible hinge member 102. The bottom wall and side wall 96 are coupled by a flexible hinge 104. The top wall 92 is coupled to side wall 94 by hinge 106 and is coupled to the side wall 96 by hinge 108. The four hinges 102, 104, 106 and 108 enable the top wall 92 and side walls 94 and 96 to fold as a parallelogram between the flat folded position shown in FIGS. 8 and 11 and an unfolded rectangular prism shape shown in FIGS. 10 and 12. In the folded position shown in FIGS. 8 and 11, the walls 90, 92, 94, 96, 98 and 100 are oriented generally parallel to one another. In the unfolded position, the receptacle 126 defines an internal volume. The end wall 98 is coupled to the top wall 92 by a flexible hinge 110 which enables the end wall 98 to rotate downward from the top wall 92 once the receptacle 126 has been unfolded into the rectangular prism shape shown in FIG. 10. Likewise, the end wall 100 is attached to the bottom wall 90 by a hinge (not shown) enabling the bottom wall to rotate upward into position. Once the endwalls 98, 100 are in their upright positions, the receptacle 126 becomes stable and will not fold back to its storage position. Alternatively, the end walls 98, 100 can be rotatably attached to the side walls 94 and 96.

Figure 13:
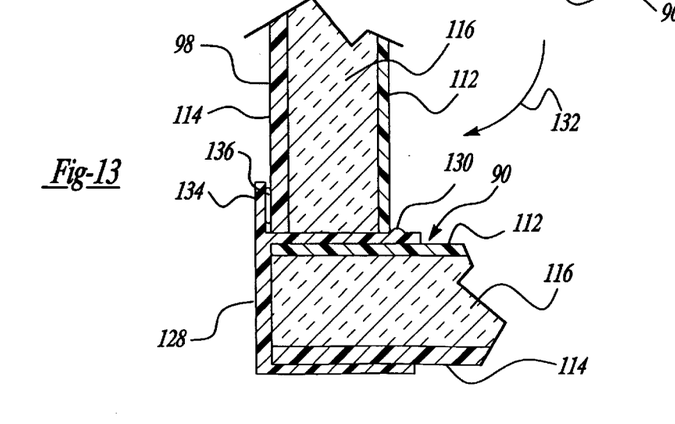
FIG. 13 is a sectional view of a portion of the bottom wall and a portion of a side wall of the receptacle shown in FIGS. 8–12.

With reference to FIG. 13, a cross section is shown through the corner between the bottom wall 90 and end wall 98. The walls of the receptacle 126 are each constructed with an inner layer 112, an outer layer 114 and an insulating core 116 therebetween. The insulating core 116 can be of any of a variety of insulating materials including a rigid foam. The inner layer 112 is a thin film which protects the insulating core 116 and provides a washable inner surface to the receptacle 126. The outer layer 114 is a hard plastic to provide structure to the receptacle walls and to provide a durable outer surface. The walls can be molded by a twin sheet thermoformed process with the foam molded therebetween. Alternatively, the walls can be cut from laminated sheets.

As shown in FIG. 13, a channel shaped edge molding 128 can be provided on the edge of the bottom wall 90. This can be an extruded plastic member that is cut to length to fit the bottom wall 90. The edge molding 128 has a raised ridge 130 to retain the end wall 98 in place after it is rotated into position as shown by the arrow 132. A raised lip 134 formed in the edge molding 128 forms a stop against rotation of the end wall 98. The end wall 98 is held in the upright position between the lip 134 and the ridge 130. The lip 134 and the ridge 130 thus form a retaining device for holding the end wall 98 in the upright position. A seal 136 can be provided between the lip 134 and the end wall 98 to seal against heat transfer between the two walls 90 and 98.

The top wall 92 is provided with a lid 138 which is removable from the top wall 92 to gain access into the receptacle 126.

Figure 14:
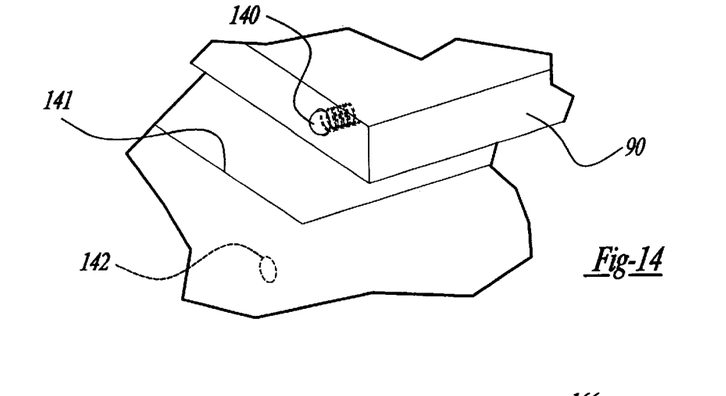
FIG. 14 is a perspective view illustrating means for removably attaching the receptacle of FIGS. 8–12 to a vehicle.

With reference to FIG. 14, the attachment of the receptacle 126 to the vehicle interior component is shown. The bottom wall 90 includes a spring biased ball or pin 140 which projects from a side edge of the wall 90. The ball 140 seats into a small recess 142 in the wall 141 of the cavity 88 into which the receptacle 126 is stored. The spring biased ball 140 enables the receptacle 126 to be removed by lifting of the receptacle with a sufficient force to release the ball from the recess 142. Other means of reliably mounting the receptacle can be used such as hook and loop fasteners strips across the bottom of the receptacle 126 and the cavity 88, snaps, magnetic fasteners, latch mechanisms and the like. The purpose of the attachment of the receptacle 126 to the vehicle interior component is to hold the receptacle in place in the vehicle.

Figure 15:
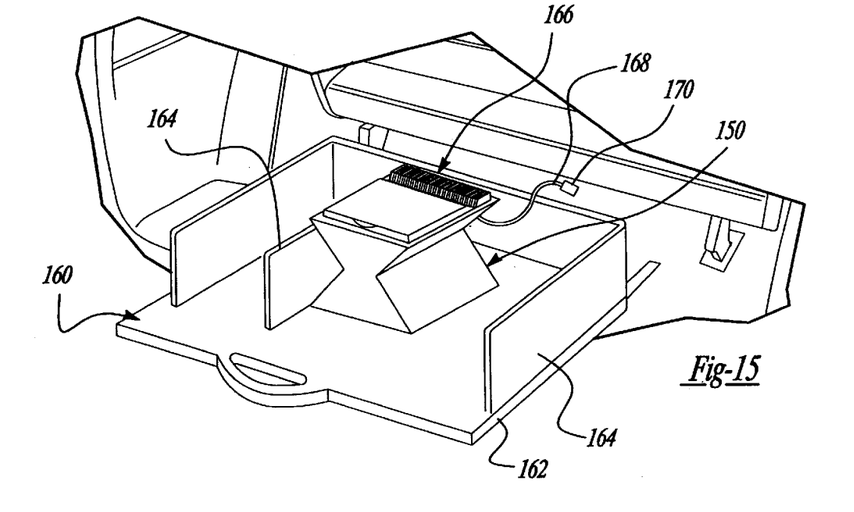
FIG. 15 is a perspective view illustrating an alternative receptacle construction with bi-fold sidewalls.

An alternative embodiment of the hard sided receptacle is shown in FIG. 15 and designated as 150. The two side walls 152 and 154 of the receptacle have a secondary hinges 156 and 158 creating bi-fold side walls. The secondary hinges 156, 158 allow upper and lower portions 157, 159 of the side walls 152, 154 to rotate relative to one another about a hinge axis of rotation parallel to the axes of rotation of hinges 102, 104, 106, and 108. This enables the receptacle 150 to be folded and unfolded by vertical lifting of the top wall 92, directly above the bottom wall 90. This reduces the floor space required for storage of the receptacle 150. Once the top wall 92 is lifted, end walls 98, 100 fold down or up in the same manner as described above.

With reference to FIG. 15, the receptacle 150 is integrated into a trunk storage system 160. The trunk storage system 160 includes a bin 162 configured to fit within a trunk or rear storage area of a vehicle. The bin 162 provides additional partitions 164 for containment of cargo in the vehicle. The cavity 88 into which the receptacle 150 is stored is formed in the bin 162 of the trunk storage system 160.

Figure 16:
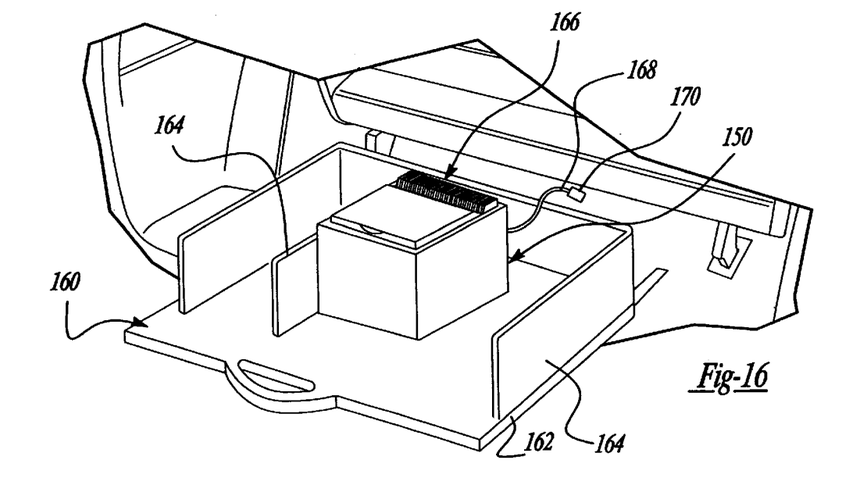
FIG. 16 is a perspective view illustrating the receptacle integrated into a trunk storage system and with a lid providing active heating/cooling of the receptacle.

Active heating or cooling of the receptacle 150 is provided by a lid 166. The lid 166 includes a thermoelectric element such as a Peltier element. The lid 166 requires electrical power which can be provided through a conductor 168 that has a plug 170 for a standard vehicle power port.

Figure 17:
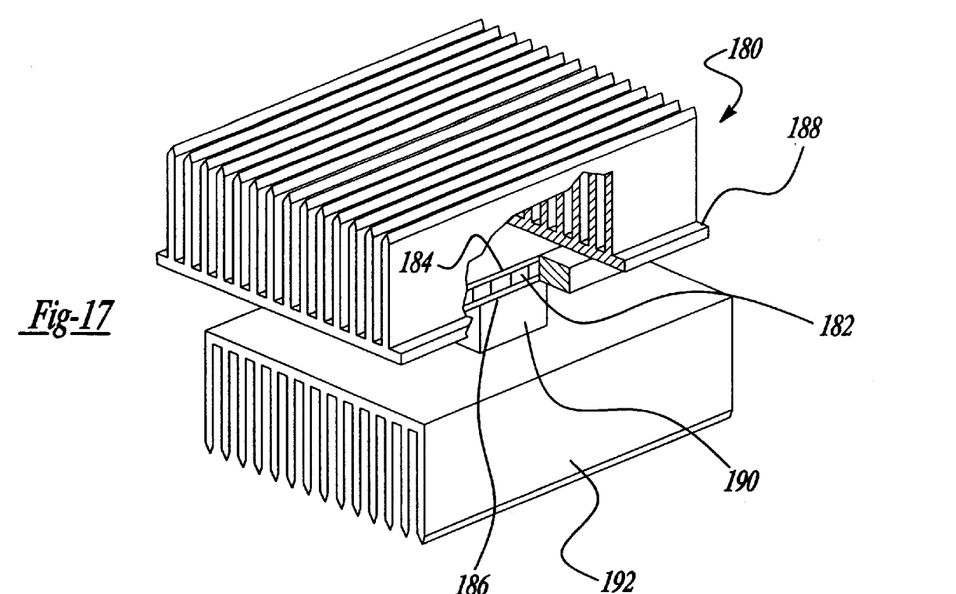
FIG. 17 is a perspective view of the thermoelectric heat exchanger in the lid shown in FIG. 16.

The lid includes a thermoelectric heat exchanger 180 shown in greater detail in FIG. 17. The thermoelectric heat exchanger 180 includes an array of thermoelectric elements 182 such as p-n junction type thermoelectric elements sandwiched between plates 184 and 186. A finned plate 188 is connected to the plate 184. A conductive block 190 has a first surface connected to the plate 186 and a second surface connected to a finned plate 192. The plates 184 and 186 are generally called hot and cold plates while the finned plates 188 and 192 are generally called heat sinks, although their respective rolls are reversed for cooling and warming operations. The conductor 168 connects a DC source to the thermoelectric elements 182. The polarity is reversed to switch between heating and cooling of the heat sink 192 disposed within the interior of the receptacle 150.

The thermal storage system of the present invention provides a receptacle in a motor vehicle which can be used to keep refrigerated items cool or heated items hot during transport of those items. The receptacle is removably mounted to the vehicle to facilitate carrying of the items to and from the vehicle. Additionally, the receptacle can be folded to reduce the size of the receptacle for storage within a cavity in the motor vehicle after passing the receptacle through an opening in a vehicle interior component.

It is to be understood that the invention is not limited to the exact construction illustrated and described above, but that various changes and modifications may be made without departing from the spirit and scope of the invention as defined in the following claims.

We claim:

1. A thermal storage system for a vehicle comprising:

a vehicle interior component;

an opening in said component to access a cavity behind said opening;

insulated walls forming a receptacle, said walls being foldable to reduce the size of said receptacle to store said receptacle in said cavity and said receptacle being removable from said cavity whereby said walls can be unfolded for use of said receptacle; and an attachment device attaching said receptacle to said vehicle interior component whereby said receptacle remains in place in the vehicle during transport, said attachment device being releasable whereby said receptacle can be selectively removed from and installed in the vehicle.

2. The storage system as defined in claim 1 wherein said walls of said receptacle are flexible and said walls are folded by flexing of said walls.

3. The storage system as defined in claim 2 wherein said walls comprise an inner liner, an outer cover and an insulating layer therebetween.

4. The storage system as defined in claim 3 wherein said insulating layer is a bat of PET fibers.

5. The storage system as defined in claim 1 wherein said walls of said receptacle include a plurality of rigid wall panels and hinges connecting each said wall panel to at least one other said wall panel to enable said receptacle to fold by rotating said wall panels relative to one another.

6. The storage system as defined in claim 1 further comprising a thermoelectric element in one of said walls of said receptacle to heat or cool said receptacle.

7. The storage system as defined in claim 1 wherein said attachment device includes hook and loop fastener strips.

8. The storage system as defined in claim 1 further comprising a closure for said opening in said vehicle interior component.

9. The storage system as defined in claim 8 wherein said closure is a zipper.

10. The storage system as defined in claim 8 wherein said closure includes a door sized to fit in said opening and further comprising a fastener device operatively associated with the door and vehicle interior component to releasably hold said door in a position closing said opening.

11. The storage system as defined in claim 10 wherein said attachment device attaches said receptacle to said door.

12. The storage system as defined in claim 1 wherein said vehicle interior component is a trim panel.

13. The storage system as defined in claim 1 wherein said vehicle interior component is a seat assembly.

14. The storage system as defined in claim 13 wherein said cavity is formed in a seat back of said seat assembly.

15. The storage system as defined in claim 13 wherein said cavity is formed in a seat bottom of said seat assembly.

16. The storage system as defined in claim 1 wherein said vehicle interior component is a floor panel.

17. The storage system as defined in claim 1 wherein said vehicle interior component is a trunk storage system.

18. The storage system as defined in claim 1 wherein said cavity is formed by a recess in said vehicle interior component.

19. An assembly comprising:
   a vehicle interior component having a cavity disposed therein;
   a storage system having a first position located substantially within said cavity, said storage system further comprising:
      a bottom wall;
      a top wall;
      first and second side walls;
      first and second ends walls;
      hinges connecting each of said side walls to both said bottom and top walls on opposite edges of said bottom and top walls;
      a hinge connecting said first end wall to one of said bottom, top, and side walls;
      a hinge connecting said second end wall to one of said bottom, top, and side walls whereby said storage system can be moved to a folded position in which said walls are oriented parallel to one another and to an unfolded position in which said walls form a rectangular prism.

20. The assembly as defined in claim 19 wherein the side walls each have lower and upper portions joined together with side wall hinges parallel to said hinges joining said side walls to said bottom and top walls whereby said side walls fold in half when said receptacle is moved to said folded position with said top wall overlying said bottom wall.

21. The assembly as defined in claim 19 further comprising a retaining device holding said end walls in said unfolded position.

22. The assembly as defined in claim 21 wherein said retaining device includes a raised lip and a raised ridge on opposite sides of said end wall when said walls are in said unfolded position.

23. The assembly as defined in claim 19 further comprising a thermal seal between said end walls and another of said walls.

24. The assembly as defined in claim 19 further comprising a thermoelectric element mounted to one of said walls for heating or cooling of said receptacle.

25. A thermal storage system for a vehicle comprising:
   a vehicle interior component;
   an opening in said component to access a cavity behind said opening;
   an insulated receptacle storable in said cavity and removable from said cavity; and
   an attachment device attaching said receptacle to said vehicle interior component whereby said receptacle remains in place in the vehicle during transport, said attachment device being releasable whereby said receptacle can be removed from the vehicle.

26. The storage system as defined in claim 25 wherein said receptacle comprises walls which are flexible whereby said receptacle is folded by flexing of said walls to reduce the size of said receptacle for storage of said receptacle in said cavity.

27. The storage system as defined in claim 25 wherein said receptacle comprises walls of substantially rigid panels joined to one another with hinges whereby said receptacle is folded by rotation of said walls relative to one another to reduce the size of said receptacle for storage of said receptacle in said cavity.

* * * * *